H. C. LAFFERTY.
CLOTHESLINE HOOK.
APPLICATION FILED MAR. 2, 1920.
1,344,589.
Patented June 22, 1920.
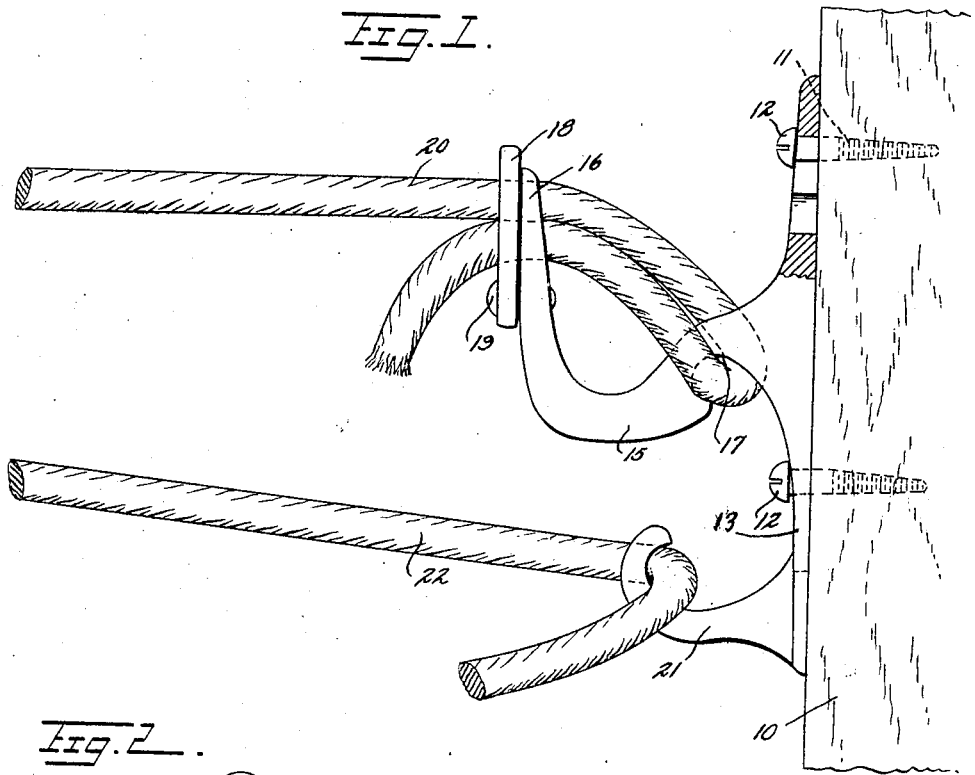
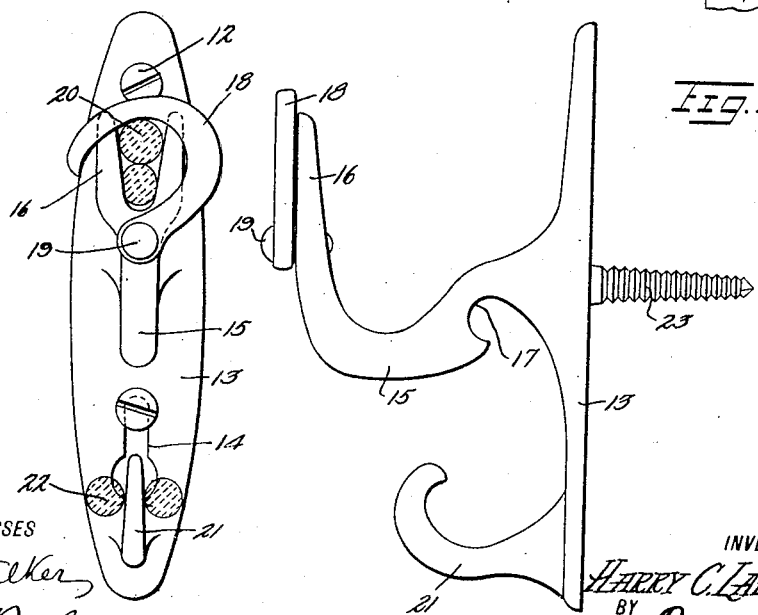
WITNESSES
H. J. Walker
L. A. Paley
INVENTOR
Harry C. Lafferty,
BY
ATTORNEYS

UNITED STATES PATENT OFFICE.

HARRY CRAWFORD LAFFERTY, OF NEW YORK, N. Y.

CLOTHESLINE-HOOK.

1,344,589.  Specification of Letters Patent.  Patented June 22, 1920.

Application filed March 2, 1920. Serial No. 362,647.

*To all whom it may concern:*

Be it known that I, HARRY C. LAFFERTY, a citizen of the United States, and a resident of the city of New York, Richmond Hill, borough of Queens, in the county and State of New York, have invented a new and Improved Clothesline-Hook, of which the following is a full, clear, and exact description.

This invention relates to rope fasteners, and has reference more particularly to a clothsline hook having an upright forked arm for receiving the rope, and holding it securely.

An object of this invention is to provide a clothesline hook which has a main supporting forked arm adapted to secure a clothesline thereto without the tying of knots.

Another object of this invention is to provide a device of the class indicated which has one or more auxiliary hooks to which several runs of the clothesline may be attached.

A further object of this invention is to provide a device of the class indicated which may be quickly detached from any supporting object.

Reference is to be had to the accompanying drawing forming a part of this specification in which it is understood that the drawing illustrates only one form of the invention, and in which—

Figure 1 is an elevation of the clothesline hook partly in cross section with the clothesline attached.

Fig. 2 is an end view of the clothesline hook.

Fig. 3 is an elevation of a modified form of the clothesline hook.

Referring to the accompanying drawing by numerals, 10 indicates any rigid object such as a clothesline post in which are a plurality of screws 11, having the heads 12 at a predetermined distance from the surface of the post 10. The clothesline hook consists of a plate 13 in which is formed a plurality of key hole slots 14 adapted to register with and engage the screw heads 12 so as to be detachably secured thereto. A transverse arm 15 is formed on the plate 13 and on its outer end, terminates in a vertical fork 16 which is preferably V-shaped. The arm 15 is also provided with a notch 17 formed between the plate 13 and the forked end 16. A catch 18 is pivotally mounted by means of a pin 19 to the forked end 16, and is preferably substantially arcuate in shape in order to engage a rope 20 and prevent same from being thrown out of the forked end 16. A hook 21 is formed on the lower end of the plate 13 so as to engage another run 22 of the rope 20. In the modified form shown in Fig. 3, the plate 13 has fixed to it a screw 23 which may be screwed into the object 10, and takes the place of the screws 11 in securing the plate 13 to said object.

When it is desired to hang a clothesline on the clothesline hook, the free end of the rope 20 is first placed in the V-shaped forked end 16. The rope 20 is then brought around the arm 15 in the notch 17 and back into the V-shaped forked end 16 above the free end of the rope. The rope 20 is then led to a hook on some distant object and is brought back again on the run 22 and hooked over the hook 21 after which it is again led to the distant object and secured thereto. The distant object may have a clothesline hook similar to that illustrated in Fig. 1. It is to be understood that the plate 13 can be made in any shape, and any number of hooks 21 may be formed thereon so that several runs of the clothesline may be supported thereby. The tension in the rope 20 will hold the free end of the rope securely in the V-shaped forked end and prevent same from being pulled therefrom, and the catch 18 will prevent the rope 20 from being thrown out of the V-shaped forked end 16 due to any accidental vibration.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a clothesline hook, a plate, means for securing said plate to a fixed object, a transverse arm formed on said plate, said transverse arm being formed on the end opposite the plate into a U-shaped fork, a notch formed in said transverse arm, means for securing the rope in said forked end and said notch, and one or more hooks formed on said plate adapted to receive return runs of said rope from a distant object.

2. In a clothesline hook, a plate, means for securing said plate to a fixed object, a transverse arm formed on said plate, said transverse arm being formed on the end opposite the plate into a V-shaped fork, a notch formed in said transverse arm, an arcuate catch pivotally mounted on said fork adapted to prevent the accidental removal of said rope from said fork, and one or more hooks formed on said plate adapted to receive return runs of said rope from a distant object.

3. In a clothesline hook, a plate, a plurality of screws secured to a fixed object, the heads of said screws being spaced apart from the surface of said object, a plurality of key hole slots formed in said plate and adapted to register with and engage the heads of said screws so as to detachably secure said plate to said fixed object, a transverse arm formed on said plate, said transverse arm being formed on the end opposite the plate into a V-shaped fork, a notch formed in said transverse arm, means for securing a rope in said forked end and said notch, and one or more hooks formed on said plate adapted to receive return runs of said rope from a distant object.

4. In a clothesline hook, a plate, a plurality of screws secured to a fixed object, the heads of said screws being spaced apart from the surface of said object, a plurality of key hole slots formed in said plate and adapted to register with and engage the heads of said screws so as to detachably secure said plate to said fixed object, a transverse arm formed on said plate, said transverse arm being formed on the end opposite the plate into a V-shaped fork, a notch formed in said transverse arm, an arcuate catch pivotally mounted on said fork adapted to prevent the accidental removal of said rope from said fork, and one or more hooks formed on said plate adapted to receive return runs of said rope from a distant object.

HARRY CRAWFORD LAFFERTY.